(12) United States Patent
Zimkiewicz et al.

(10) Patent No.: US 11,414,024 B2
(45) Date of Patent: Aug. 16, 2022

(54) MOUNTING ARRANGEMENT AND METHOD OF INSTALLING AN AUDIO UNIT IN A VEHICLE DASHBOARD

(71) Applicant: Calsonic Kansei North America, Inc., Farmington Hills, MI (US)

(72) Inventors: Tim Zimkiewicz, Novi, MI (US); Christopher Dawson, Westland, MI (US); Alan Fontanin, Lasalle (CA); Rene Zarco Garcia, Farmington Hills, MI (US)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 375 days.

(21) Appl. No.: 16/567,018

(22) Filed: Sep. 11, 2019

(65) Prior Publication Data

US 2021/0070232 A1 Mar. 11, 2021

(51) Int. Cl.
*B60R 11/02* (2006.01)
*B60R 11/00* (2006.01)

(52) U.S. Cl.
CPC ....... *B60R 11/02* (2013.01); *B60R 2011/0005* (2013.01); *B60R 2011/0047* (2013.01); *B60R 2011/0288* (2013.01)

(58) Field of Classification Search
CPC ............. B60R 11/02; B60R 2011/0005; B60R 2011/0047; B60R 2011/0288

USPC ....................................................... 296/24.34
See application file for complete search history.

(56) References Cited

U.S. PATENT DOCUMENTS

| 5,560,572 | A | * | 10/1996 | Osborn | H05K 7/1421 |
| | | | | | 248/27.3 |
| 6,779,826 | B2 | * | 8/2004 | Nakajima | B60K 37/02 |
| | | | | | 296/70 |
| 2008/0265607 | A1 | * | 10/2008 | Biggs | B60R 11/02 |
| | | | | | 296/72 |

FOREIGN PATENT DOCUMENTS

| KR | 20010011292 | | 2/2001 | | |
| WO | WO-2011043356 A1 | * | 4/2011 | ............ | E05F 1/1215 |
| WO | WO-2013135421 A1 | * | 9/2013 | ............ | B60K 37/04 |

* cited by examiner

*Primary Examiner* — Hilary L Gutman
(74) *Attorney, Agent, or Firm* — Foley & Lardner LLP

(57) ABSTRACT

A vehicle dashboard assembly includes a dashboard defining a component opening and a slot in the component opening, the slot having a first slot portion, a second slot portion extending from the first slot portion, and a third slot portion extending from the second slot portion and higher than the first slot portion. The assembly further includes a component configured to be received in the component opening, and at least one bracket coupled to the component and comprising a projection extending from a side of the bracket and configured to be received in the slot.

16 Claims, 9 Drawing Sheets

MOUNTING ARRANGEMENT AND METHOD OF INSTALLING AN AUDIO UNIT IN A VEHICLE DASHBOARD

BACKGROUND

The present application relates generally to a mounting arrangement for installing a component in a vehicle dashboard and, more specifically, for installing the audio unit in the dashboard without applying a finishing panel surrounding an outer periphery of the audio unit.

In a conventional vehicle dashboard assembly, an opening is provided in a vehicle dashboard for receiving an audio unit therein. The opening forms a profile, which is larger than an outer profile of the audio unit, such that when the audio unit is installed in the opening, a gap is formed between the outer profile of the audio unit and the profile of the opening. This gap allows an installer to see around the outer profile of the audio unit during the installation process to properly align the audio unit in a corresponding support structure in the dashboard opening. However, the presence of the gap requires an additional finishing panel to be coupled to the dashboard in order to conceal the gap from view. The addition of the finishing panel increases the production cost and complexity of installing the dashboard assembly in the vehicle and limits the possible dashboard designs. For example, the finishing panel prevents the audio unit to be flush-mounted with the dashboard, since the finishing panel generally overlaps the outer profile of the audio unit.

It is therefore advantageous to provide a dashboard mounting structure and corresponding bracket, which allows a user to align and install an audio unit without a gap between the dashboard opening and an audio unit and without a finishing panel. In this configuration, the audio unit itself conceals the dashboard structure and bracket from view when the audio unit is fully installed in the dashboard.

SUMMARY

One embodiment relates to a vehicle dashboard assembly, including a dashboard defining a component opening and a slot in the component opening, the slot having a first slot portion, a second slot portion extending from the first slot portion, and a third slot portion extending from the second slot portion and higher than the first slot portion. The assembly further includes a component configured to be received in the component opening, and at least one bracket coupled to the component and comprising a projection extending from a side of the bracket and configured to be received in the slot.

Another embodiment relates to a method of installing a component in a vehicle dashboard, including providing a dashboard having a rear end and a forward end and defining a component opening formed therein, the component opening having a side wall and a slot formed in the side wall. The method further includes providing a bracket comprising a projection extending from a side of the bracket and passing the projection in a forward direction in a first portion of the slot to a second portion of the slot. The method further includes lifting the projection in an upward direction in the second portion of the slot toward a third portion of the slot. The method further includes passing the projection in a forward direction in the third portion of the slot.

DETAILED DESCRIPTION

Figure 1:
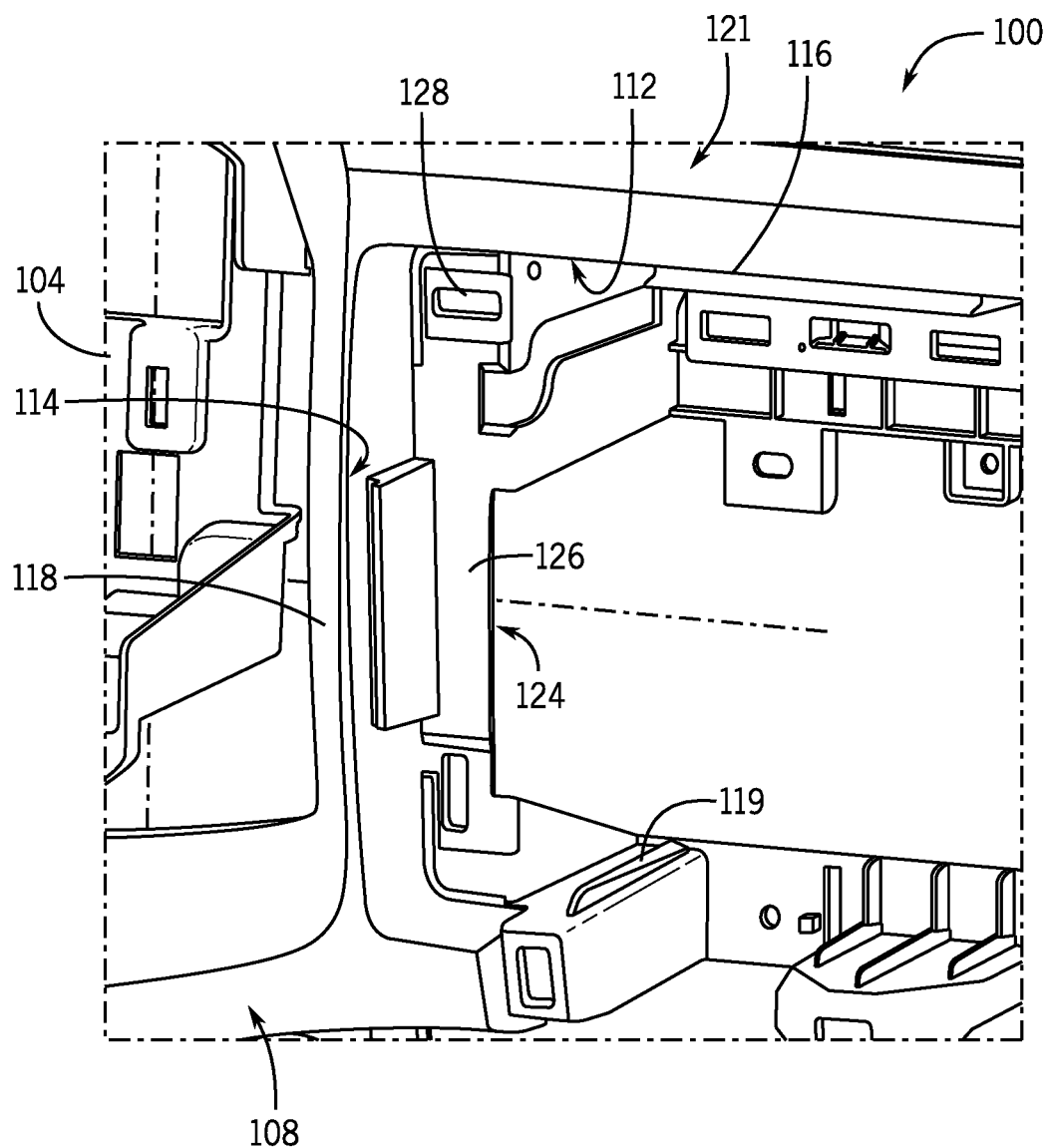
FIG. 1 shows a vehicle dashboard according to an exemplary embodiment.

Referring to FIG. 1, a dashboard assembly 100 for a vehicle is shown according to an exemplary embodiment. The dashboard assembly 100 includes a dashboard 102 (i.e., an instrument panel), which is coupled to a rail 104 extending laterally across a width of the vehicle, the rail 104 supporting the weight of the dashboard 102 in the vehicle. The dashboard 102 includes a decorative finished outer surface 105, which is exposed to passengers in the vehicle.

The dashboard 102, as shown in FIG. 1, includes an opening 106 (i.e., a component opening, a receptacle, a dashboard opening, etc.) formed at a rear end 108 of the dashboard 102 and facing a passenger compartment of the vehicle. The opening 106 is configured to receive a component 110 (i.e., an electronic component, a vehicle part, etc.) therein as part of the dashboard assembly 100. While the present application describes a component 110 generally, it should be understood that components may include various electronic or other components such as audio units, navigation systems, infotainment systems, vehicle controls or instruments (e.g., speedometer, tachometer, etc.), HVAC controls, speakers, gear shift mechanisms, storage compartments, or other components, which are either permanent or removable. Further, electronic or other components may be received in an opening in other vehicle structures in substantially the same way.

The opening 106 includes an opening upper wall 112 and two opposing opening side walls 114 extending substantially vertically downward from (e.g., perpendicularly to) the opening upper wall 112. At the rear end 108 (i.e., rear surface) of the dashboard 102, the opening upper wall 112 defines an upper edge 116 and each of the opening side walls 114 defines a side edge 118.

Figure 2:
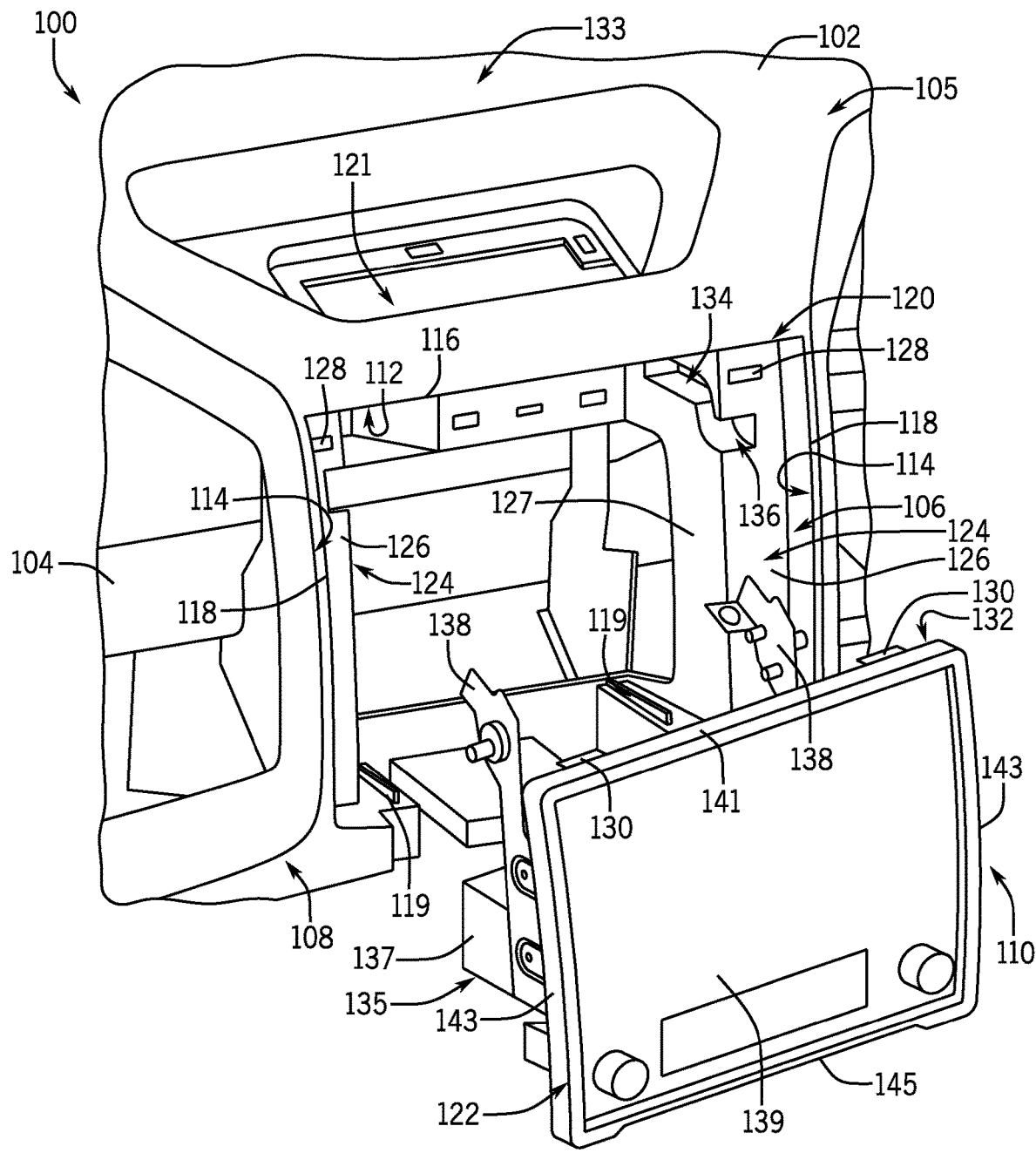
FIG. 2 shows a vehicle component, such as an audio unit, being installed in the dashboard of FIG. 1.

Referring to FIG. 2, the upper edge 116 and side edges 118 collectively form an opening outer profile 120 and are configured to receive a component 110 having a component outer profile 122 that is complementary to (i.e., substantially the same as) the opening outer profile 120 of the opening 106. In this configuration, the component outer profile 122 is configured to engage substantially all of the upper edge 116 and side edges 118 and provide the component 110 flush-mounted with the rear end 108 of the dashboard 102. The opening 106 further includes at least one guide rib 119 (i.e., strut, support, etc.) formed at a lower end of the opening 106 opposing the opening upper wall 112. For example, the opening 106 may include a plurality of guide ribs 119, such as the pair of guide ribs 119 extending from each of the opening side walls 114. According to other exemplary embodiments, the opening 106 may include more or fewer guide ribs 119. Each guide rib 119 is configured to support at least a portion of the weight of the component 110, as discussed in further detail below.

Referring still to FIG. 2, the dashboard 102 includes a pair of opposing support walls 124 disposed laterally (e.g., in the direction that the rail 104 extends across the vehicle) inward from the opening side walls 114. Specifically, each opening side wall 114 has a support wall 124 extending therefrom. Each support wall 124 includes a first support surface 126 (i.e., a lateral or rear surface or face) and a second support surface 127 (i.e., a longitudinal or side surface or face). The first support surface 126 extends laterally inward into the opening 106 substantially perpendicular to the corresponding side wall 114. The second support surface 127 extends away from the rear end 108 of the dashboard 102, substantially perpendicular to the first support surface 126 as well as offset from and parallel to the opening side wall 114.

A clip opening 128 is formed in each of the support walls 124 and is configured to receive a clip 130 on a forward side 132 of the component 110 therein for coupling the component 110 to the dashboard 102. For example, the clip opening 128 may be formed in the first support surface 126 of the support wall 124. When the component 110 is fully inserted into the opening 106, each clip 130 is aligned with and received in a corresponding clip opening 128. According to an exemplary embodiment, the clip 130 may be received in the corresponding clip opening 128 with an interference fit, such that a portion of the clip 130 expands after it is inserted into the clip opening 128, preventing the clip 130 from being withdrawn from the clip opening 128 and thereby coupling the component 110 to the dashboard 102. The dashboard 102 may further include an upper (i.e., second, auxiliary, tray, etc.) opening 131 formed in an upper end 133 (i.e., upper surface) or other surface of the dashboard 102 that is separate from the opening 106 and configured to provide access to the forward side 132 of the component 110 when the component 110 is fully received in the opening 106 for coupling the component 110 to the dashboard 102.

The clip opening 128 is disposed proximate the opening side wall 114, such that when the component 110 is aligned with the opening 106, the component outer profile 122 extends laterally, overlapping the clip opening 128 and covering (i.e., conceals) the clip opening 128 from view. In a conventional dashboard assembly, a gap is formed between a component and an opening and covered with a finishing panel. In contrast, the substantially identical opening outer profile 120 and component outer profile 122 as well as the overlap between the component 110 and the clip openings 128 means that no gap is available for an installer to visually align the clip 130 with the clip opening 128.

A substantially planar slot 134 (i.e., a channel, groove, inset portion, guide, etc.) is formed in each of support walls 124 and is configured to help an installer insert the component 110 into the opening 106 of the dashboard 102 and align the clips 130 with the clip openings 128 without being able to see the clip openings 128. The slot 134 is formed in the support wall 124 proximate the opening upper wall 112 and proximate the clip openings 128. The slot 134 is formed in the second support surface 127 of the support wall 124 and extends from the first support surface 126 in a generally forward direction (i.e., from the rear end 108 toward the forward end 109 of the dashboard 102). The slot 134 defines a slot opening 136 in the first support surface 126, which allows an installer to insert a portion of the component 110 through the first support surface 126 and into the slot 134.

The component 110 includes a body 135 having two opposing sides 137 and a rear surface 139 (e.g., a screen, a user interface, etc.), which extends laterally outward from the sides 137 of the body 135. The rear surface 139 forms a finished decorative surface of the component 110, which is exposed to passengers in the vehicle. According to an exemplary embodiment, a pair of opposing brackets 138 (e.g., first and second brackets) are coupled to opposing sides of the body 135 of the component 110 for engaging the slot 134. The component outer profile 122 is defined by an outer periphery of the rear surface 139, including an upper edge 141, two opposing side edges 143 extending substantially vertically downward from the upper edge 141, and a lower edge 145 substantially parallel to the upper edge 141 and extending between the side edges 143.

Figure 3:
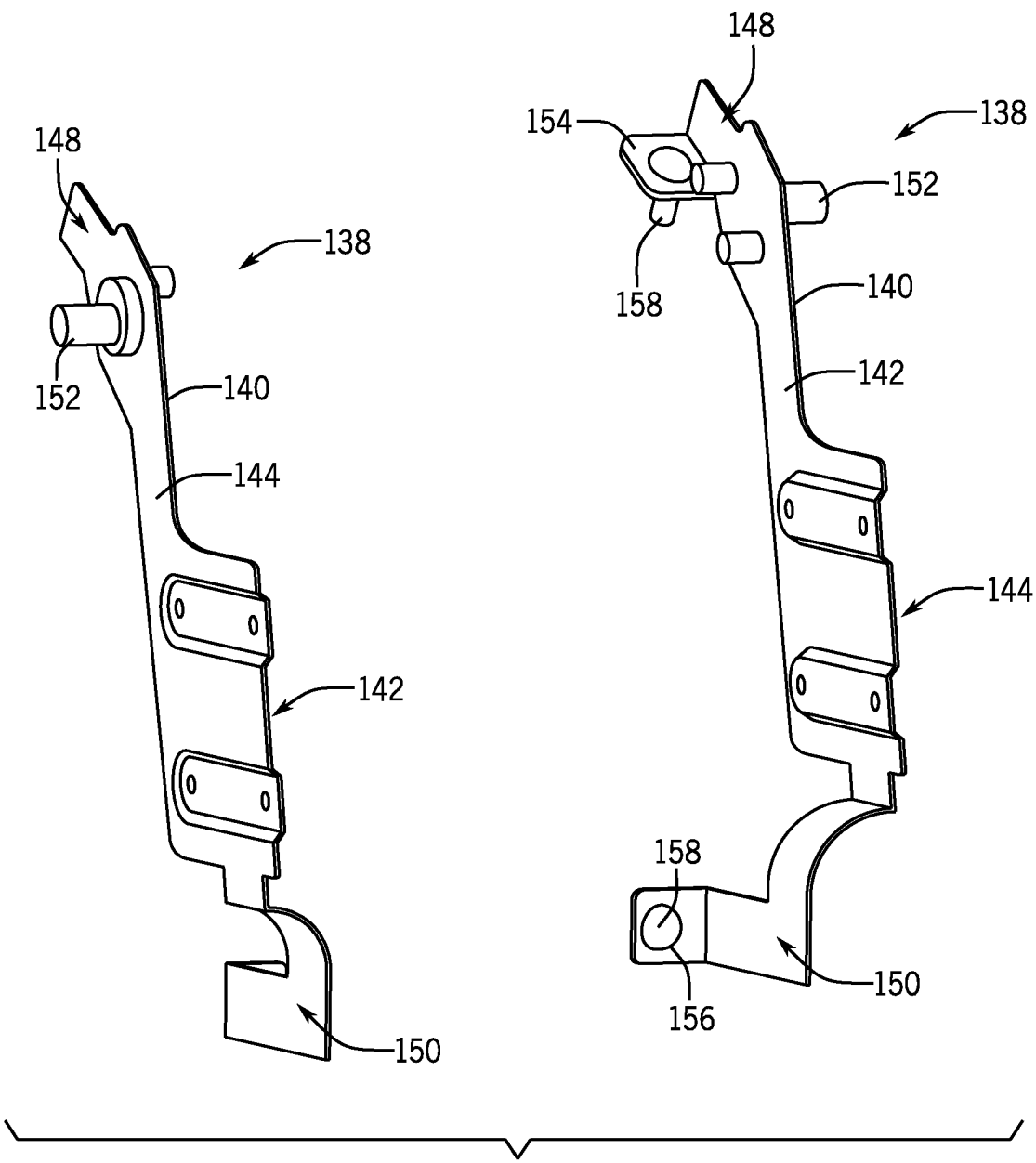
FIG. 3 shows a pair of brackets for installing the component in the dashboard of FIG. 1.

Referring now to FIG. 3, the brackets 138 are shown according to an exemplary embodiment. The brackets 138 include a substantially planar body 140 having a bracket first side 142 and an opposing bracket second side 144. The bracket first side 142 is configured to be coupled to one of the sides 137 of the component 110. When the component 110 is fully inserted into the opening 106, the bracket second side 144 is disposed between the side 137 of the component 110 and the second support surface 127, such that the bracket second side 144 faces the second support surface 127 of the support wall 124.

The bracket 138 further defines an upper end 148 (i.e., a first end) and an opposing lower end 150 (i.e., a second end). A projection 152 (i.e., a pin, a guide, a member, etc.) extends laterally outward from the bracket second side 144, proximate the upper end 148 of the bracket 138. As will be discussed in further detail below, the projection 152 is configured to be received in the slot 134 before the component 110 is fully received in the opening 106, helping an installer align the component 110 within the opening 106. The projection 152 may be formed as a separate part that is coupled to the bracket 138 or may be integrally-formed with the bracket 138 according to various exemplary embodiments.

An upper flange 154 extends laterally inward from the bracket first side 142 proximate the upper end 148 and is configured to receive a fastener 158 therethrough for coupling the upper end 148 of the bracket 138 to the dashboard 102. Similarly, a lower flange 156 extends laterally inward from the bracket first side 142 proximate the lower end 150 and is configured to receive a fastener 158 therethrough for coupling the lower end 150 of the bracket 138 to the dashboard 102.

Figure 4:
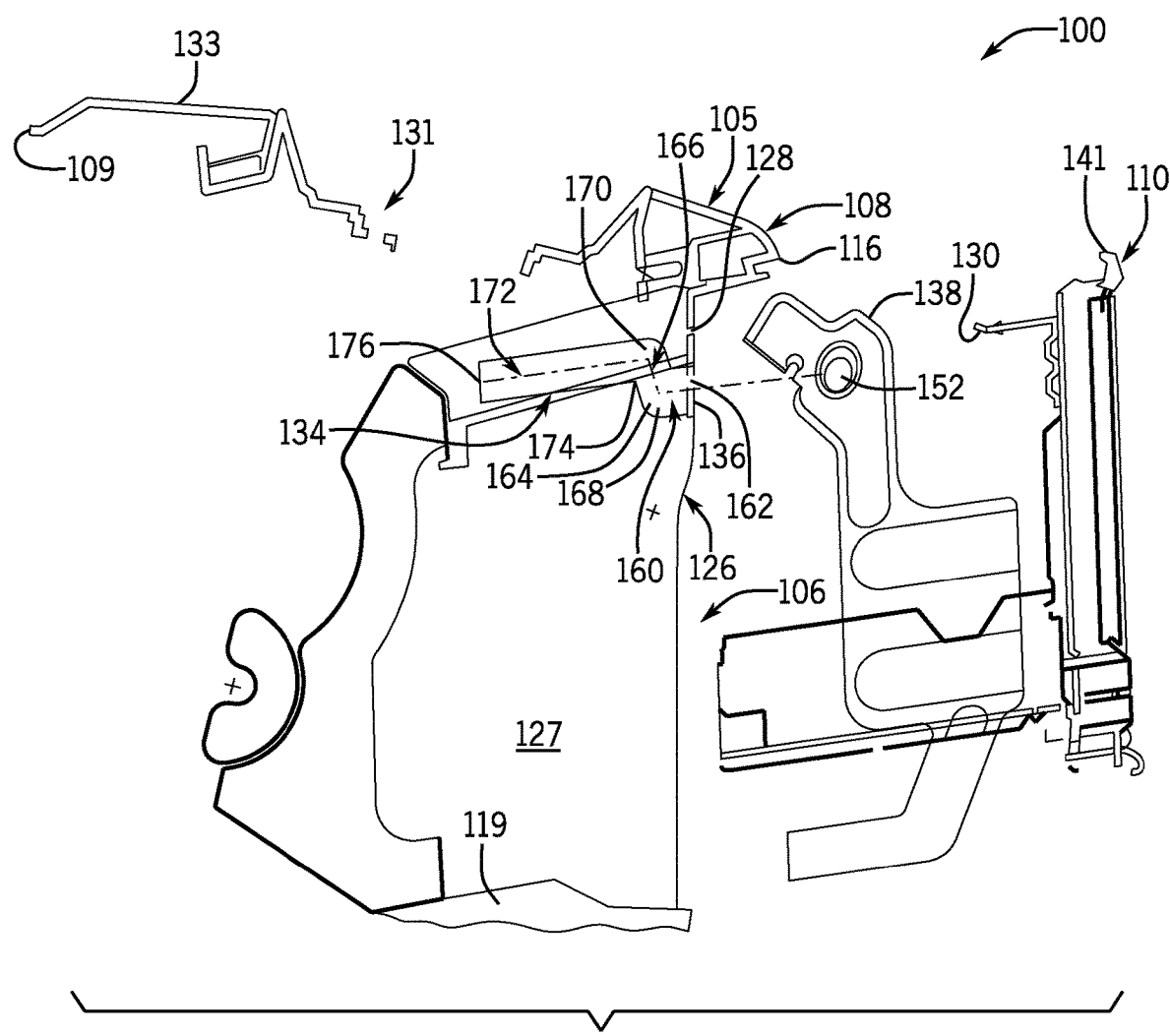
FIG. 4 shows an installation of a component in a dashboard according to an exemplary embodiment.

Referring now to FIG. 4, the component 110 is shown being installed in the dashboard 102 according to an exemplary embodiment. The dashboard 102 includes a forward end 109 opposing the rear end 108 and the slot 134 extends from the first support surface 126 away from the rear end 108 and toward the forward end 109 of the dashboard 102. As shown in FIG. 4, the slot 134 includes a first slot portion 160 (i.e., a first portion, an insertion portion, rear leg or portion, receiver portion, holding portion, a lower portion, etc.), which extends in the support wall 124 from the slot opening 136 in the forward direction. The first slot portion 160 defines a rear end 162 at the slot opening 136 and an opposing forward end 164. The slot 134 further includes a second slot portion 166 (i.e., a second portion, a connecting portion, intermediate leg, ramp, riser, a ramp portion, etc.), which extends substantially upward from the forward end 164 of the first slot portion 160. Specifically, the second slot portion 166 defines a lower end 168 at the forward end 164 of the first slot portion 160 and an opposing upper end 170 at a height above the lower end 168. The slot 134 further includes a third slot portion 172 (i.e., a third portion, a sliding portion, forward leg or portion, an upper portion, etc.), which extends in the generally forward from the upper end 170 of the second slot portion 166. The third slot portion 172 defines a rear end 174 at the upper end 170 of the second slot portion 166 and an opposing forward end 176. The third slot portion 172 is disposed at a height higher than (i.e., above) the first slot portion 160, as will be discussed in further detail below.

Referring still to FIG. 4, the first slot portion 160 is shown angled with a downward slope in the forward direction. Specifically, the forward end 164 of the first slot portion 160 is disposed at a height below the rear end 162. Similarly, the third slot portion 172 is shown with a downward slope in the forward direction, such that the forward end 176 of the third slot portion 172 is disposed at a height below the rear end 174. For example, the third slot portion 172 may be substantially parallel to the first slot portion 160. The second slot portion 166 is shown with an upward slope in the forward direction. Specifically, the upper end 170 of the second slot portion 166 is disposed at a height that is above the lower end 168 and the upper end 170 is positioned further forward of the lower end 168. According to yet another exemplary embodiment, one or both of the first slot portion 160 or the third slot portion 172 may be substantially parallel to the opening upper wall 112.

Figure 5:
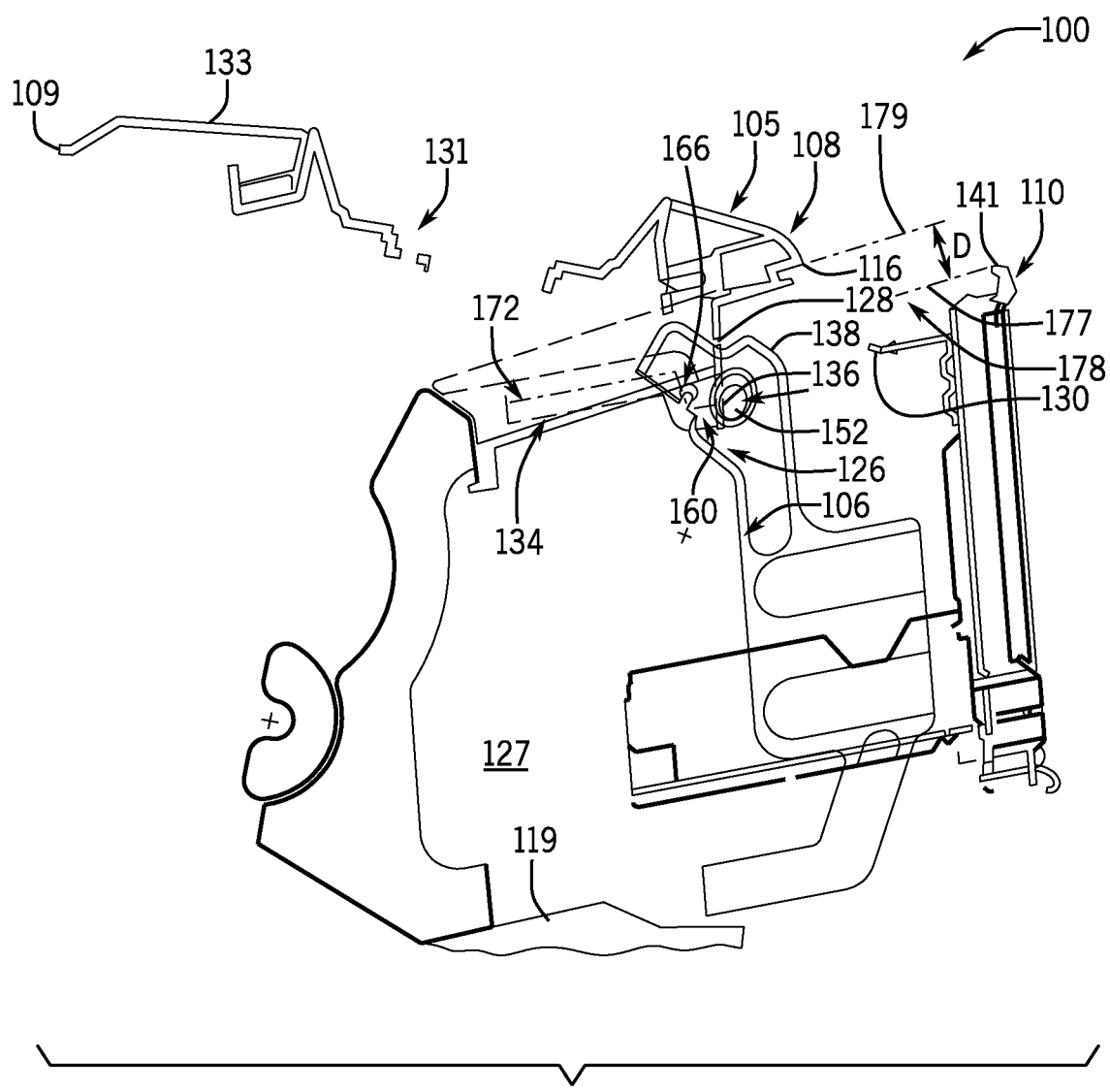
FIG. 5 shows the component of FIG. 4 in a first position.

Referring now to FIG. 5, the component 110 is shown aligned with the opening 106 according to an exemplary embodiment. Specifically, the component 110 is shown in a first position when the projection 152 is received in the slot 134 through the slot opening 136. When the component 110 is disposed in the first position, the upper edge 141 of the component outer profile 122 is spaced apart from the upper edge 116 of the opening outer profile 120, defining a gap 178 therebetween. For example, the upper edge 141 of the component outer profile 122 is disposed along a component axis 177 (i.e., a first axis), which is parallel to the third slot portion 172 and the upper edge 116 of the opening outer profile 120 is disposed along a dashboard axis 179 (i.e., a second axis), which is parallel to the third slot portion 172 and the component axis 177. The component axis 177 is spaced apart from the dashboard 179 axis by a distance D.

In the configuration shown in FIG. 5, the installer is located rearward of the electrical component 110 and is able to see the slot opening 136 through the gap 178 when the component 110 is disposed proximate the opening 106 in order to align the projections 152 with the corresponding slot openings 136 and insert the projections into the slots 134. In other words, the gap 178 is provided when a portion of the component 110 first engages the dashboard 102.

Figure 6:
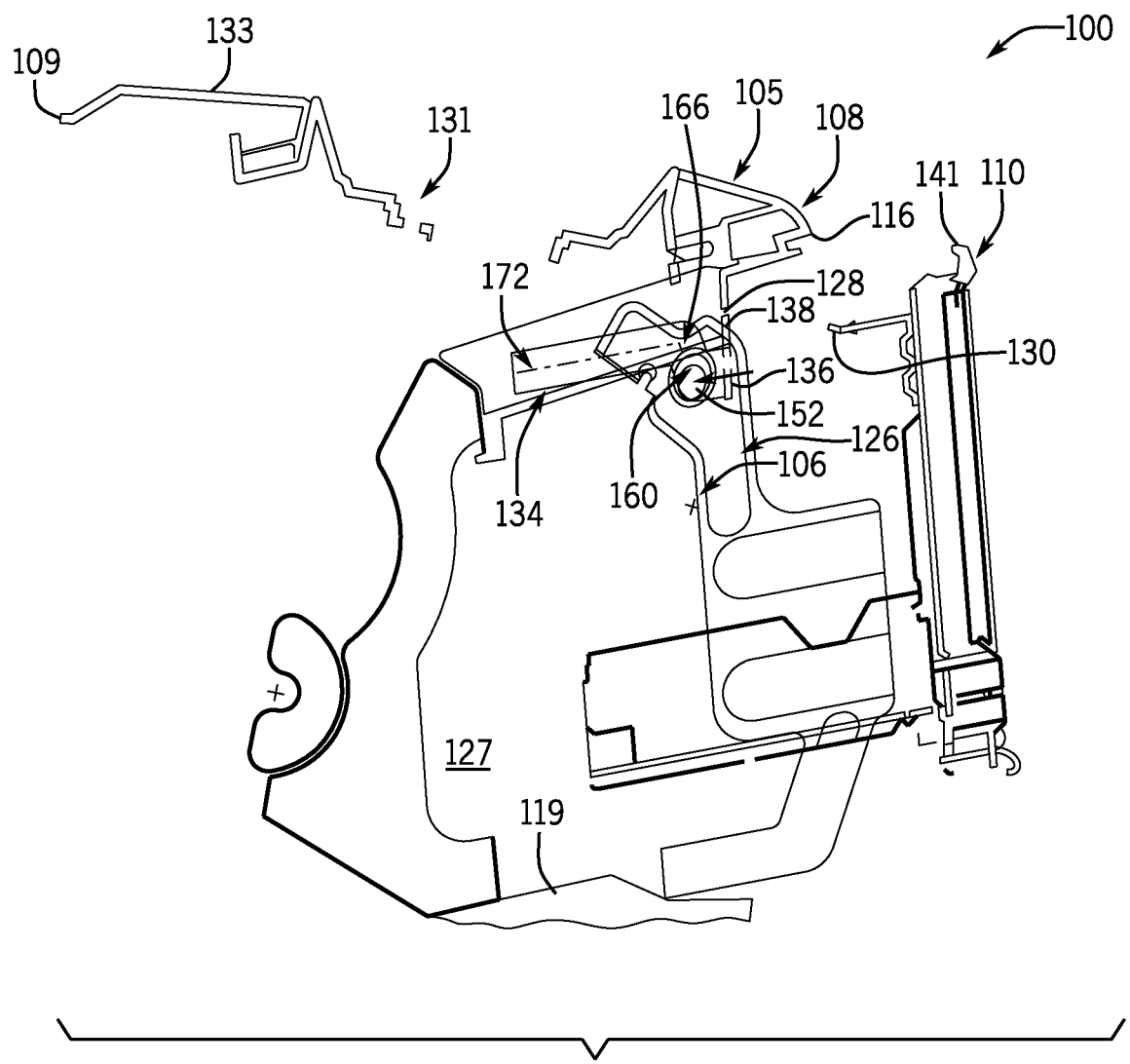
FIG. 6 shows the component of FIG. 4 in a second position.

Referring now to FIG. 6, the component 110 is shown in a second position. Specifically, during the installation process, the component 110 is further inserted into the opening 106 from the first position and the projections 152 pass within and along the first slot portions 160 in the forward direction, until component 110 is disposed in the second position and the projections 152 are disposed at the forward end 164 of the first slot portion 160. In this configuration, the downward slope of the first slot portion 160 biases the projections 152 toward the forward end 164 of the first slot portion 160. It should be appreciated that the downward slope of the first slot portion 160 allows the installer to temporarily place the component 110 in the second position and then reposition his or her hands in another location on the component 110 to facilitate upward movement of the component 110 relative to the dashboard 102. The downward slope further reduces amount of force that the installer is required to apply to the component 110 because the force of gravity on the pulls the projection 152 downward in the first slot portion 160 toward the forward end 164.

Figure 7:
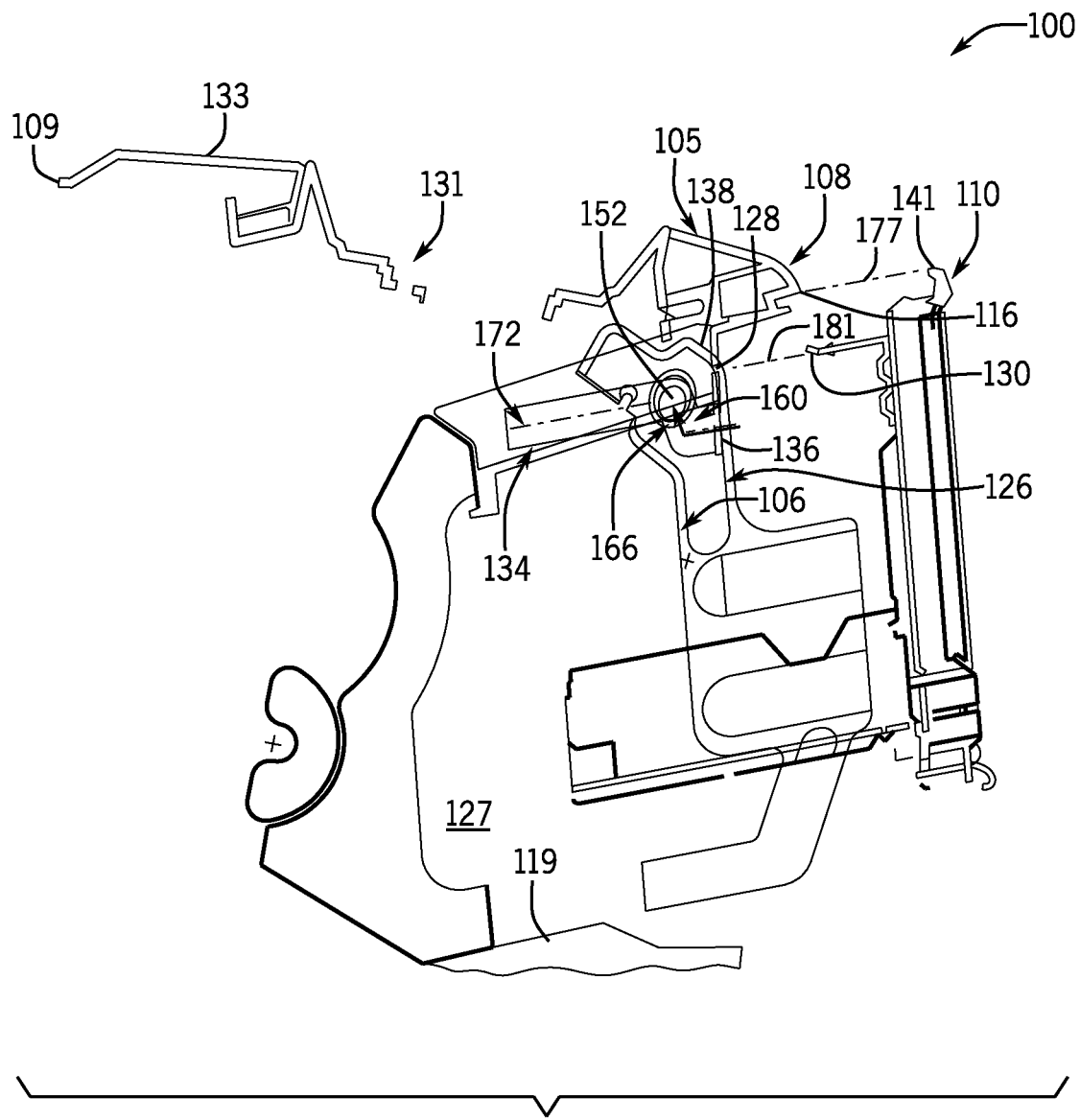
FIG. 7 shows the component of FIG. 4 in a third position.

Referring now to FIG. 7, the component 110 is shown in a third position. Specifically, the component 110 is lifted from the second position, such that the projections 152 move along the second slot portion 166 from the lower end 168 until the projections 152 are disposed at the upper end 170 of the second slot portion 166. The upward slope of the second slot portion 168 may assist the installer by using force in a forward direction to move the projections 152 upward in the second slot portion 168, rather than requiring the installer to provide a vertical force on the component 110. Notably, the component 110 has a large face at the rear surface 139, which provides a larger area for the installer to push on the component 110 and reducing pinch points around the lower edge 145 of the component outer profile 122.

In the third position, the upper edge 141 of the component outer profile 122 is substantially aligned with the upper edge 116 of the opening outer profile 120 along a shared axis, such that the component axis 177 is substantially collinear with the dashboard axis 179. In the third position, the slot opening 136 may be concealed from the installer's view. A clip axis 181 extends outward from the clip opening 128 and is substantially parallel to the third slot portion 172 and the clip 130 extends from the forward side 132 of the component 110 axially aligned with and substantially collinear with the clip opening 128 along the clip axis 181.

Figure 8:
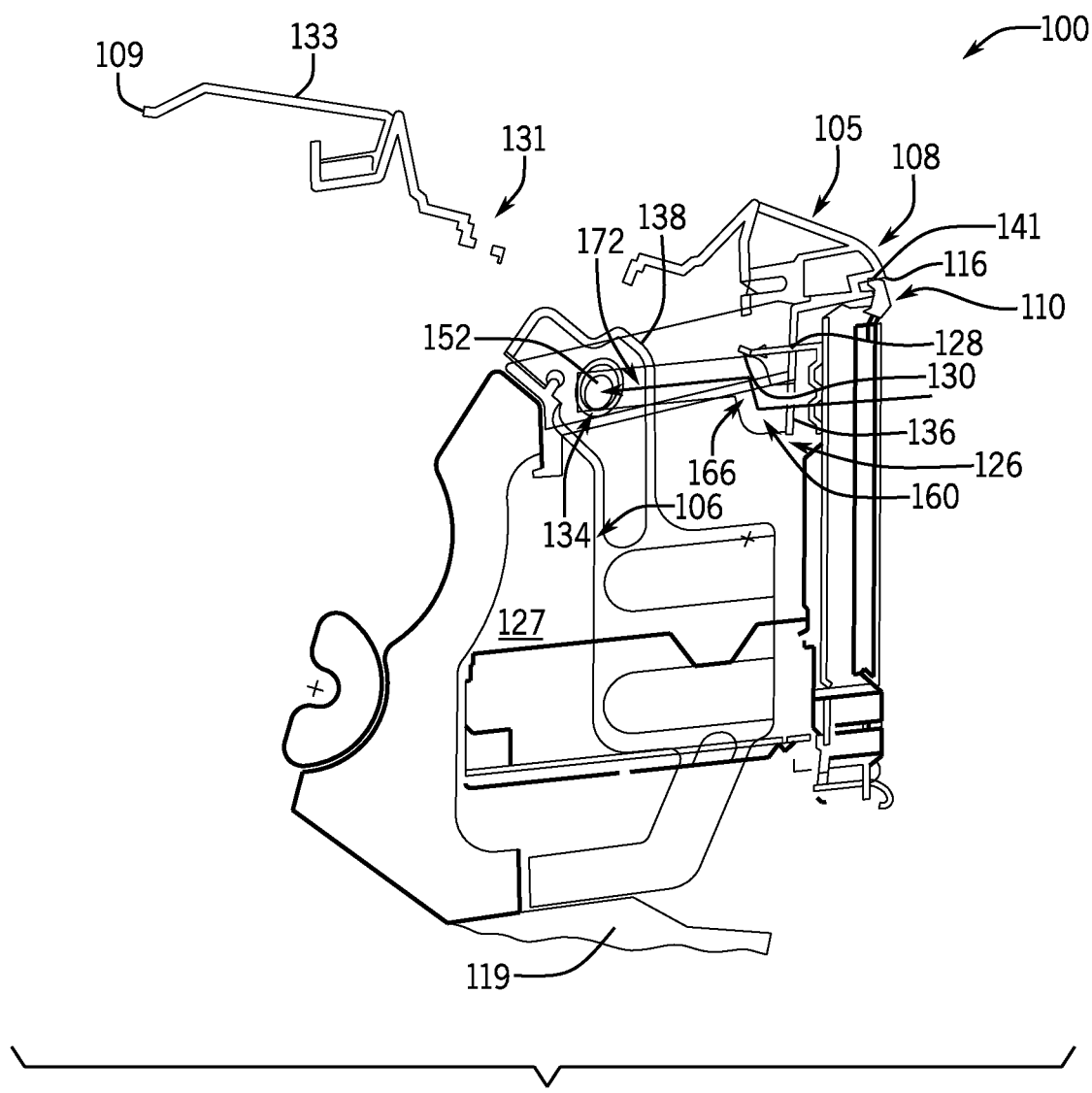
FIG. 8 shows the component of FIG. 4 in a fourth position.

Referring now to FIG. 8, the component 110 is shown in a fourth (i.e., fixing) position. Specifically, the component 110 is further inserted into the opening 106 from the third position and the projections 152 pass within and along the third slot portions 172 in the forward direction, until the component 110 is disposed in the fourth position and fully received in the opening 106. In the fourth position, the projections 152 are disposed at the forward end 176 of the third slot portion 172. Similar to the first slot portion 160, the downward slope of the third slot portion 172 biases the projections 152 toward the forward end 176 of the third slot portion 172, reducing the force required by the installer to push the component 110 fully into the opening 110.

The guide rib 119 enables an assembly person to rest a bottom surface of the bracket 138 onto the guide rib 119 to prevent the decorative outer surface 105 from being scratched during installation of the component 110. The guide rib 119 defines a surface having a downward slope in the forward direction, the surface being substantially parallel to the third slot portion 172. In this configuration, the lower end 150 of the bracket 138 is disposed on and engages the guide rib 119 while the upper end 148 of the bracket 138 is disposed proximate the third slot portion 172. For example, the lower end 150 of the bracket 138 may first engage the guide rib 119 when the projection 152 is first received in the third slot portion 172. As the lower end 150 moves along the surface having the downward slope in the forward direction, the projection 152 is aligned with the slot opening 136 and guided through the slot 134. In various embodiments, the guide rib 119 is configured such that the guide rib 119 does not interface with the bracket 138 when the projection 152 is positioned within the slot 134. The guide rib 119 may support at least a portion of the weight of the component 110 thereon and the bracket 138 may engage the guide rib 119 at substantially all positions of the component 110 between the third and fourth positions since the third slot portion 172 and the guide rib 119 have substantially the same downward slope in the forward direction. A length of the guide rib 119 is longer than a length of the third slot portion 172. In various embodiments, the guide rib 119 is formed by die draw using a die, with drafted added to facilitate removal of the guide rib 119 from the die.

In the fourth position, the upper edge 141 of the component outer profile 122 is disposed against (e.g., directly against) the upper edge 116 of the opening outer profile 120. Similarly, the side edges 143 of the component outer profile 122 are disposed against (e.g., directly against) the side edges 118 of the opening outer profile 120. In this configuration, when the component 110 is disposed in the fourth position, the rear surface 139 of the component 110 is aligned with and forms a flush surface with the rear end 108 of the dashboard 102 without a finishing panel being coupled to the dashboard 102 after the installation of the component 110. Specifically, the decorative rear surface 139 of the component 110 is adjacent to and flush with the decorative outer surface 105 of the dashboard 102.

It should further be appreciated that as the component 110 is moved from the third position to the fourth position, the clip 130 moves along the clip axis 181 until a forward end 183 of the clip 130 is received through the clip opening 128. As discussed above, the clip 130 may be received in the clip opening 128 with an interference fit, such that the forward end 183 of the clip 130 is received through the clip opening 128 and then expands, preventing the clip 130 from being withdrawn back through the clip opening 128, thereby coupling the component 110 to the dashboard 102. According to an exemplary embodiment, the clip 130 and the clip opening 128 may be formed laterally between the brackets 138 (e.g., inward from the bracket first sides 142), although according to other exemplary embodiments, the clip 130 and the clip opening 128 may be formed laterally outside of one or both of the brackets 138 (e.g., outward from at least one of the bracket second sides 144). For example, the dashboard 102 may include a plurality of clip openings 128 and the component 110 may include a corresponding plurality of clips 130 configured to be received in the plurality of openings 128. It should further be appreciated that the component 110 may be coupled to the dashboard 102 in other ways, as will be described in further detail below.

Figure 9:
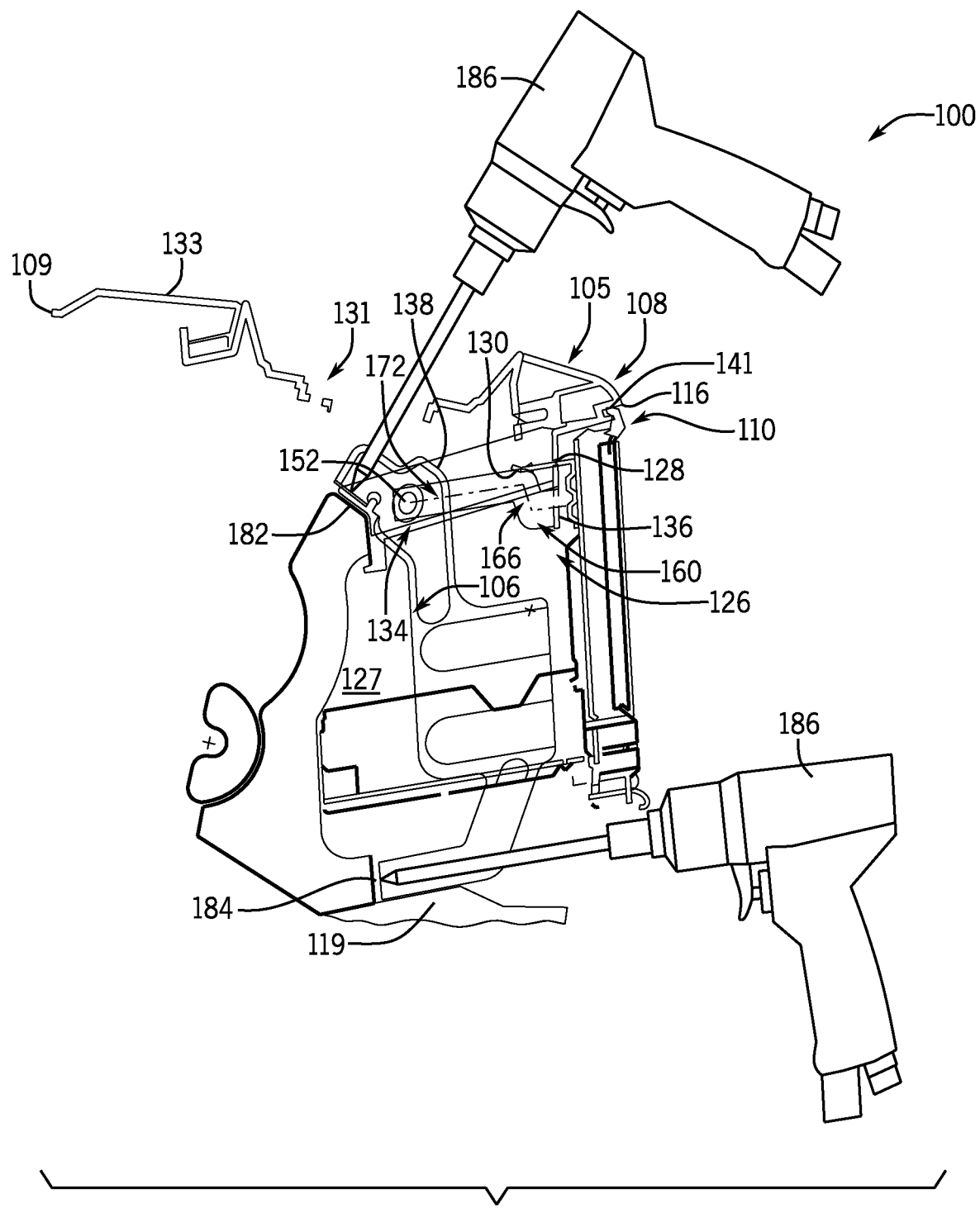
FIG. 9 shows the component of FIG. 4 being coupled to the dashboard.

Referring now to FIG. 9, the component 110 is shown being coupled to the dashboard 102. The dashboard 102 defines an upper connecting surface 182 and a lower connecting surface 184. When the component 110 is in the fourth position, the upper flange 154 of the bracket 138 is disposed against the upper connecting surface 182 of the dashboard 102 and the lower flange 156 is disposed against the lower connecting surface 184. Since there is no gap between the component 110 and the opening 106, the upper opening 131 provides access for the tool 186 to reach the upper flange 154 after the component 110 is disposed in the fourth position. A fastener and a portion of the tool 186 is passed through the upper opening 131 and couples the upper flange 154 to the upper connecting surface 182. A panel (not shown) may then be inserted into the upper opening 131 or coupled to the upper end 133 of the dashboard 102 for concealing the bracket 138. According to an exemplary embodiment, the upper opening 131 may be formed in a tray 188 or other inset portion of the dashboard 102.

When the component 110 is in the fourth position, the lower flange 156 of the bracket 138 may be exposed, such that a fastener and a portion of the tool 186 is passed under the lower edge 145 of the component outer profile 122 and couples the lower flange 156 to the lower connecting surface 184. After the lower flange 156 is coupled to the dashboard 102, an additional vehicle component or a finishing panel may be disposed on and coupled to the dashboard 102 below the component 110, such that the bracket 138 is concealed from view behind the additional component or finishing panel. The additional component or finishing panel may be disposed directly against the lower edge 145 of the component outer profile 122, such that the additional component or finishing panel forms a flush rear surface with the component 110 and the dashboard 102.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A vehicle dashboard assembly, comprising:
a dashboard defining a component opening and a slot in the component opening, the slot comprising:
a first slot portion;
a second slot portion extending from the first slot portion; and
a third slot portion extending from the second slot portion and higher than the first slot portion;
a component configured to be received in the component opening; and
at least one bracket coupled to the component and comprising a projection extending from a side of the bracket and configured to be received in the slot;
wherein the first slot portion defines a downward slope in a forward direction from a rear end of the dashboard to a forward end of the dashboard.

2. The vehicle dashboard assembly of claim 1, wherein the second slot portion defines an upward slope in the forward direction from the rear end of the dashboard to the forward end of the dashboard.

3. The vehicle dashboard assembly of claim 2, wherein the third slot portion defines a downward slope in the forward direction from the rear end of the dashboard to the forward end of the dashboard.

4. The vehicle dashboard assembly of claim 1, further comprising a guide rib at a lower end of the component opening, the guide rib configured to engage a lower end of the bracket.

5. The vehicle dashboard assembly of claim 4, wherein the guide rib is substantially parallel to the third slot portion.

6. The vehicle dashboard assembly of claim 1, wherein the third slot portion defines a downward slope in the forward direction from the rear end of the dashboard to the forward end of the dashboard.

7. The vehicle dashboard assembly of claim 1, further comprising:
a clip opening defined in the dashboard; and
a clip extending from a forward surface of the component and configured to be received in and engage the clip opening.

8. The vehicle dashboard assembly of claim 7, wherein the clip is received in the clip opening with an interference fit.

9. The vehicle dashboard assembly of claim 7, wherein:
the at least one bracket comprises a pair of opposing brackets coupled to the component;
the component opening defines two opposing side walls, each side wall defining a slot configured to receive a projection from a corresponding one of the opposing brackets; and
the clip is disposed laterally between the brackets.

10. The vehicle dashboard assembly of claim 1, further comprising an upper flange extending from an upper end of the bracket and configured to couple the bracket to the dashboard.

11. The vehicle dashboard assembly of claim 10, wherein the dashboard defines an upper opening separate from the component opening and formed in an upper end of the dashboard, the upper opening configured to provide access to the upper flange when the component is fully received in the component opening.

12. The vehicle dashboard assembly of claim 1, further comprising a lower flange extending from a lower end of the bracket and configured to couple the bracket to the dashboard.

13. The vehicle dashboard assembly of claim 12, wherein the lower flange is configured to be accessed below a lower edge of the component when the component is fully received in the component opening.

14. A vehicle dashboard assembly, comprising:
a dashboard defining a component opening and a slot in the component opening, the slot comprising:
a first slot portion;
a second slot portion extending from the first slot portion; and
a third slot portion extending from the second slot portion and higher than the first slot portion;
a component configured to be received in the component opening; and
at least one bracket coupled to the component and comprising a projection extending from a side of the bracket and configured to be received in the slot;
wherein the second slot portion defines an upward slope in a forward direction from a rear end of the dashboard to a forward end of the dashboard.

15. The vehicle dashboard assembly of claim 14, wherein the third slot portion defines a downward slope in the forward direction from the rear end of the dashboard to the forward end of the dashboard.

16. A vehicle dashboard assembly, comprising:
a dashboard defining a component opening and a slot in the component opening, the slot comprising:
a first slot portion;
a second slot portion extending from the first slot portion; and
a third slot portion extending from the second slot portion and higher than the first slot portion;
a component configured to be received in the component opening; and
at least one bracket coupled to the component and comprising a projection extending from a side of the bracket and configured to be received in the slot;
wherein the third slot portion defines a downward slope in a forward direction from a rear end of the dashboard to a forward end of the dashboard.

* * * * *